(12) United States Patent
Frank et al.

(10) Patent No.: US 12,495,118 B2
(45) Date of Patent: Dec. 9, 2025

(54) HALFTONE SCREEN TILES

(71) Applicant: Hewlett-Packard Development Company, L.P., Spring, TX (US)

(72) Inventors: Tal Frank, Ness Ziona (IL); Orel Bat Mor, Ness Ziona (IL); Shani Gat, Ness Ziona (IL); Gideon Amir, Ness Ziona (IL); Itamar Roth, Ness Ziona (IL); Ram Dagan, Ness Ziona (IL)

(73) Assignee: HEWLETT-PACKARD DEVELOPMENT COMPANY, L.P., Spring, TX (US)

( * ) Notice: Subject to any disclaimer, the term of this patent is extended or adjusted under 35 U.S.C. 154(b) by 0 days.

(21) Appl. No.: 18/261,042

(22) PCT Filed: Feb. 11, 2021

(86) PCT No.: PCT/US2021/017590
§ 371 (c)(1),
(2) Date: Jul. 11, 2023

(87) PCT Pub. No.: WO2022/173435
PCT Pub. Date: Aug. 18, 2022

(65) Prior Publication Data
US 2024/0064260 A1    Feb. 22, 2024

(51) Int. Cl.
*H04N 1/405* (2006.01)
*H04N 1/32* (2006.01)
(52) U.S. Cl.
CPC ....... *H04N 1/4055* (2013.01); *H04N 1/32256* (2013.01)

(58) Field of Classification Search
CPC ... H04N 1/4055; H04N 1/32256; H04N 1/405
See application file for complete search history.

(56) References Cited

U.S. PATENT DOCUMENTS

| | | | | | |
|---|---|---|---|---|---|
| 5,253,084 | A | * | 10/1993 | Rylander | H04N 1/4058 358/465 |
| 5,315,098 | A | * | 5/1994 | Tow | G06T 1/0028 235/494 |
| 5,828,463 | A | * | 10/1998 | Delabastita | H04N 1/52 358/3.17 |
| 5,835,687 | A | | 11/1998 | Brown et al. | |
| 5,946,103 | A | * | 8/1999 | Curry | G06T 1/0028 235/494 |

(Continued)

OTHER PUBLICATIONS

Hel-Or, H. Z., "Watermarking and copyright labeling of printed images", Journal of electronic Imaging, vol. 10, No. 3, Jul. 2001, pp. 794-803.

*Primary Examiner* — Ted W Barnes
(74) *Attorney, Agent, or Firm* — Jordan IP Law, LLC

(57) ABSTRACT

In an example, a method includes obtaining, by at least one processor, a first halftone screen tile having a first halftone pattern. In some examples, the method further comprises obtaining a second halftone screen tile having a second halftone pattern. The method may include determining a halftone screen having a predetermined spatial arrangement of the first and second halftone screen tiles, wherein the relative placement of the first and second halftone screen tiles in the predetermined spatial arrangement provides a signature for the halftone screen which when applied to image data provides a printed output in which the signature is discernible.

6 Claims, 10 Drawing Sheets

(56) References Cited

U.S. PATENT DOCUMENTS

| | | | |
|---|---|---|---|
| 5,946,453 A | 8/1999 | Broddin et al. | |
| 6,081,345 A * | 6/2000 | Curry | H04N 1/32256 |
| | | | 380/54 |
| 6,108,450 A | 8/2000 | Ueda | |
| 6,252,971 B1 * | 6/2001 | Wang | H04N 1/32203 |
| | | | 382/296 |
| 6,439,682 B1 | 8/2002 | Kakutani | |
| 6,778,299 B2 | 8/2004 | Lin et al. | |
| 7,417,771 B2 | 8/2008 | Chang | |
| 8,014,035 B2 | 9/2011 | Monga et al. | |
| 8,023,160 B2 | 9/2011 | Monga et al. | |
| 8,111,428 B2 * | 2/2012 | Asai | H04N 1/4057 |
| | | | 358/3.17 |
| 8,755,088 B2 * | 6/2014 | Russell | H04N 1/405 |
| | | | 358/3.09 |
| 9,661,186 B1 * | 5/2017 | Chapman | H04N 1/40012 |
| 2004/0165219 A1 * | 8/2004 | Chen | H04N 1/405 |
| | | | 358/3.06 |
| 2008/0192297 A1 * | 8/2008 | Wang | H04N 1/4058 |
| | | | 358/3.06 |
| 2009/0213430 A1 * | 8/2009 | Wang | H04N 1/52 |
| | | | 382/190 |
| 2009/0245613 A1 * | 10/2009 | Wu | H04N 1/00867 |
| | | | 382/137 |
| 2010/0002265 A1 * | 1/2010 | Yasutomi | H04N 1/4055 |
| | | | 358/3.06 |
| 2010/0060942 A1 * | 3/2010 | Monga | H04N 1/32229 |
| | | | 358/3.28 |
| 2010/0060943 A1 * | 3/2010 | Monga | G06K 1/121 |
| | | | 358/3.28 |
| 2013/0010336 A1 * | 1/2013 | Wang | H04N 1/52 |
| | | | 358/3.06 |
| 2013/0293928 A1 * | 11/2013 | Kashibuchi | G06K 15/1881 |
| | | | 358/3.06 |
| 2018/0152596 A1 * | 5/2018 | Veis | H04N 1/4055 |
| 2021/0377422 A1 * | 12/2021 | Ulichney | G06K 19/0614 |
| 2022/0230031 A1 * | 7/2022 | Bartels | G06K 15/1881 |
| 2022/0256053 A1 * | 8/2022 | Bartels | H04N 1/4092 |

* cited by examiner

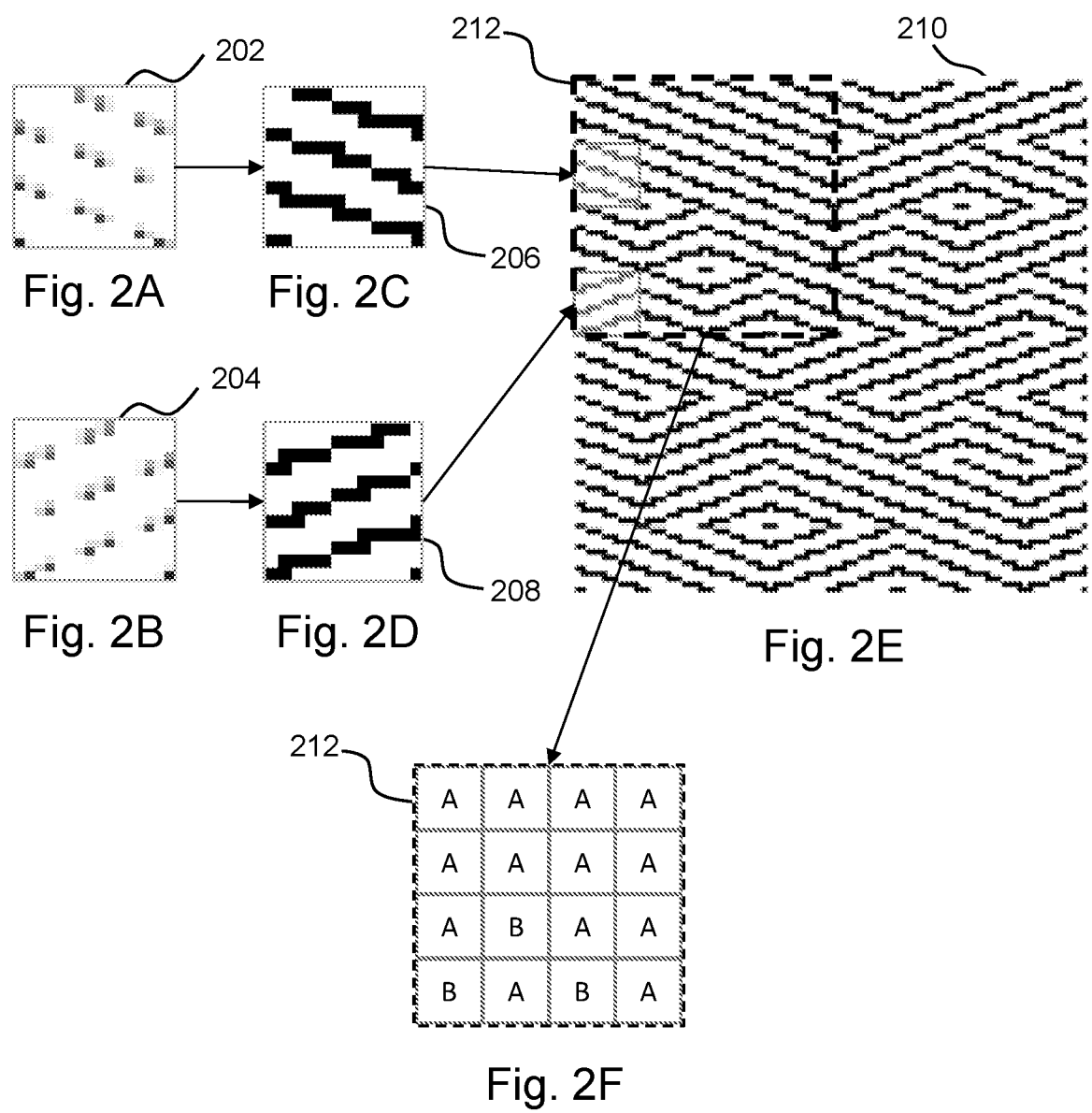

| 0.9 | 0.9 | 0.9 | 0.9 | 0.9 | 0.9 | 0.9 | 0.9 | 0.9 | 0.9 |
|-----|-----|-----|-----|-----|-----|-----|-----|-----|-----|
| 0.9 | 0.9 | 0.9 | 0.8 | 0.7 | 0.7 | 0.6 | 0.7 | 0.9 | 0.9 |
| 0.8 | 0.6 | 0.6 | 0.6 | 0.6 | 0.5 | 0.5 | 0.5 | 0.6 | 0.7 |
| 0.6 | 0.5 | 0.5 | 0.4 | 0.4 | 0.4 | 0.3 | 0.3 | 0.4 | 0.5 |
| 0.5 | 0.4 | 0.4 | 0.2 | 0.1 | 0.1 | 0.2 | 0.2 | 0.3 | 0.5 |
| 0.5 | 0.3 | 0.2 | 0.1 | 0.0 | 0.1 | 0.2 | 0.3 | 0.4 | 0.5 |
| 0.4 | 0.2 | 0.2 | 0.1 | 0.1 | 0.2 | 0.3 | 0.4 | 0.6 | 0.6 |
| 0.5 | 0.4 | 0.3 | 0.3 | 0.4 | 0.5 | 0.6 | 0.6 | 0.6 | 0.7 |
| 0.8 | 0.7 | 0.5 | 0.6 | 0.6 | 0.6 | 0.6 | 0.7 | 0.8 | 0.9 |
| 0.9 | 0.8 | 0.7 | 0.7 | 0.7 | 0.8 | 0.8 | 0.9 | 0.9 | 0.9 |

Fig. 3A

| 0.9 | 0.9 | 0.9 | 0.9 | 0.9 | 0.9 | 0.9 | 0.9 | 0.9 | 0.9 |
|-----|-----|-----|-----|-----|-----|-----|-----|-----|-----|
| 0.9 | 0.9 | 0.9 | 0.8 | 0.7 | 0.7 | 0.6 | 0.7 | 0.9 | 0.9 |
| 0.8 | 0.6 | 0.6 | 0.6 | 0.6 | *0.5* | *0.5* | *0.5* | 0.6 | 0.7 |
| 0.6 | *0.5* | *0.5* | *0.4* | *0.4* | *0.4* | *0.3* | *0.3* | *0.4* | *0.5* |
| *0.5* | *0.4* | *0.4* | *0.2* | *0.1* | *0.1* | *0.2* | *0.2* | *0.3* | *0.5* |
| *0.5* | *0.3* | *0.2* | *0.1* | *0.0* | *0.1* | *0.2* | *0.3* | *0.4* | *0.5* |
| *0.4* | *0.2* | *0.2* | *0.1* | *0.1* | *0.2* | *0.3* | *0.4* | 0.6 | 0.6 |
| *0.5* | *0.4* | *0.3* | *0.3* | *0.4* | *0.5* | 0.6 | 0.6 | 0.6 | 0.7 |
| 0.8 | 0.7 | *0.5* | 0.6 | 0.6 | 0.6 | 0.6 | 0.9 | 0.9 | 0.9 |
| 0.9 | 0.8 | 0.7 | 0.7 | 0.7 | 0.8 | 0.8 | 0.9 | 0.9 | 0.9 |

Fig. 3B

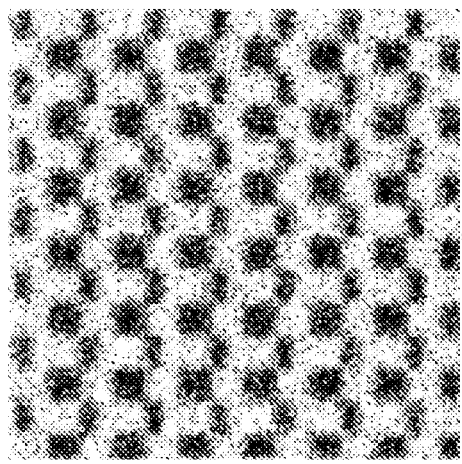
Fig. 10A
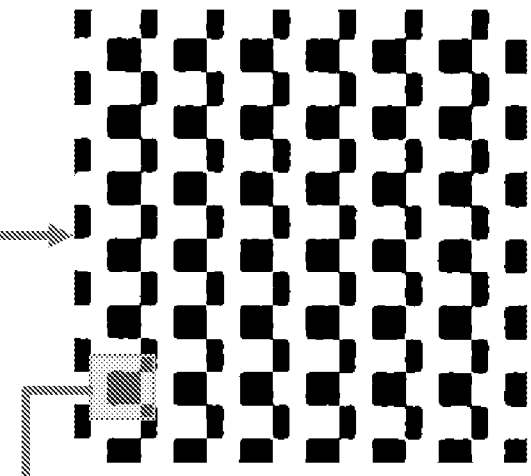
Fig. 10B
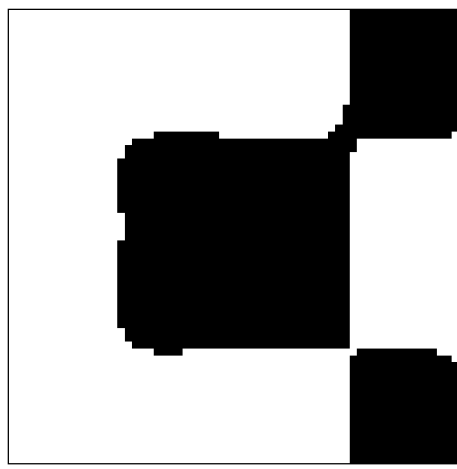
Fig. 10C
| A | A | A | B |
|---|---|---|---|
| A | B | B | A |
| A | B | B | A |
| A | A | A | B |
Fig. 10D
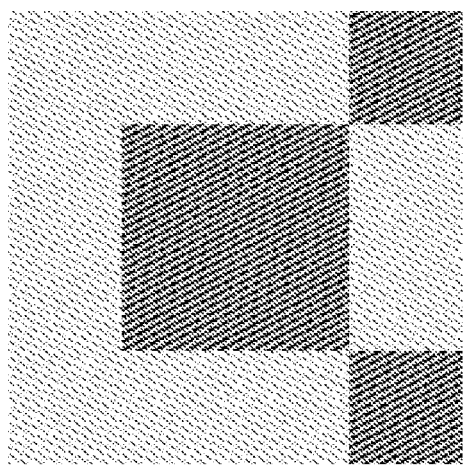
Fig. 10E
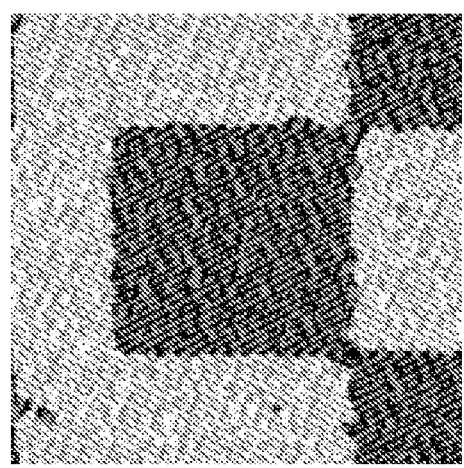
Fig. 10F

HALFTONE SCREEN TILES

BACKGROUND

Printing systems may convert input data (for example, data representing an image for two-dimensional printing, or data representing an object for three dimensional printing) to print instructions, which specify where print materials (for example, colorants such as inks, toners or other printable materials) are to be placed in a print operation.

Techniques used in converting data include use of halftone screens. In some examples, halftone screens are implemented as arrays, or matrices, of threshold values, which correspond to pixels in the input data. Values associated with pixels in the input data are compared to at least one threshold for that pixel and print material may be deposited (or not deposited) based on the comparison. Examples of halftone screens include amplitude modulation halftone screens, in which a size of an applied dot or spot may be varied, and frequency modulation halftone screens, in which a number of applied dots or spots may be varied.

BRIEF DESCRIPTION OF DRAWINGS

For a more complete understanding, reference is now made to the following description taken in conjunction with the accompanying drawings in which:

FIGS. 2A to 2D illustrate examples of halftone screen tiles;

FIG. 2E shows an example of an arrangement of halftone screen tiles to form a super-tile;

FIG. 2F shows an example of a portion of the signature arrangement of tiles within a portion of a super-tile;

FIGS. 3A to 3C are examples of a halftone threshold matrix;

FIGS. 10A to 10F illustrate in more detail an example of obtaining a signature from a printed image.

DETAILED DESCRIPTION

Figure 1:
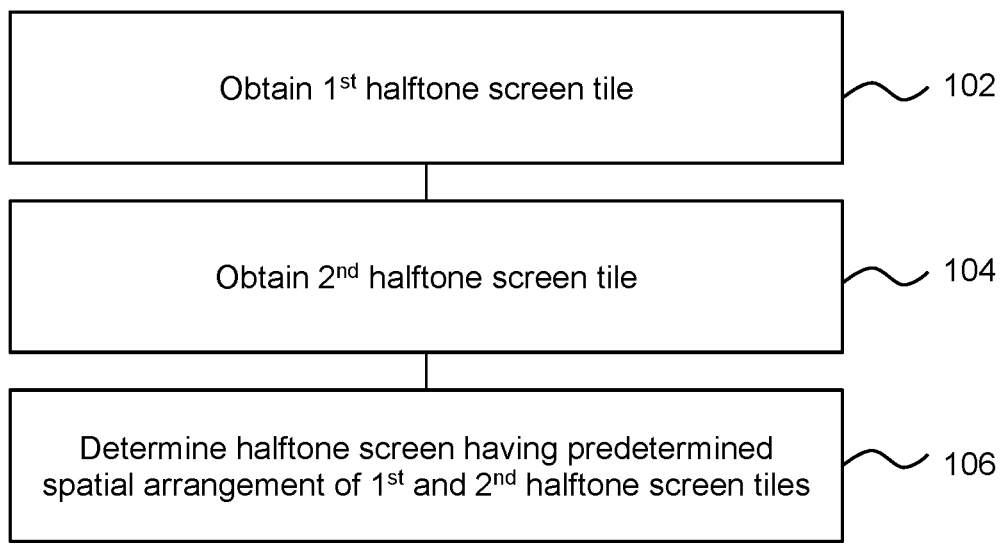
FIG. 1 is a flowchart of an example of a method of determining a halftone screen encoding a signature arrangement of halftone screen tiles.

In the case of two-dimensional printing, a print addressable location may comprise at least one pixel, and each print addressable location may be printed with at least one colorant such as inks (for example cyan, magenta, yellow and black inks), coatings or other print materials, as well as combinations of those print materials. Halftone screens may be used to determine where to place drops of agents (for example, colorants, coatings and the like).

In the case of three-dimensional printing, which is also referred to as additive manufacturing, three-dimensional space may be characterised in terms of 'voxels', i.e. three-dimensional pixels, wherein each voxel occupies or represents a discrete volume. In examples of three-dimensional printing therefore, an addressable area may comprise at least one voxel and each voxel may be 'printed' i.e. generated or manufactured, using one or a combination of agents and/or build materials.

To briefly discuss three-dimensional printing in greater detail, objects generated by an additive manufacturing process may be formed in a layer-by-layer manner. In one example, an object is generated by solidifying portions of layers of build material. In examples, the build material may be in the form of a powder or powder-like material, a fluid or a sheet material. In some examples, the intended solidification and/or physical properties may be achieved by printing an agent which absorbs energy onto a layer of the build material. Energy may be applied to the layer and the build material on which an agent has been applied may coalesce and solidify upon cooling. In other examples, directed energy may be used to selectively cause coalescence of build material, or binding agents may be used to selectively solidify a build material.

Some processes that print three-dimensional objects use control data or print instructions generated from a model of a three-dimensional object. This control data may, for example, specify the locations at which to apply an agent to the build material, or where a build material itself may be placed, and the amounts to be placed. Halftone screens may be used to determine where to place drops of agents (for example, the energy absorbing agent, binding agent and/or colorants).

In examples of halftone screens, it may be intended to avoid patterns associated with the screen appearing in the printed output. For example, a 'moiré' pattern may be seen where clusters of dots repeat or, in the case of printing multiple colors (which may be printed in separate layers, or 'separations'), dots from one color may visually interfere with dots printed in another color. Such patterns may be seen to detract from image quality. Halftone screens may be designed to avoid such patterns appearing in printed outputs, or to minimise their occurrence or impact. However, in examples herein, halftone screens may be designed to deliberately include a pattern, for example such that a 'signature' may be discernible in the printed output. In some examples, this 'signature' may be suitable for validating an origin of the printed output.

In the examples described herein, the methods are primarily described with respect to use of a single color of print agent, however, the methods may be applied to printing with more than one color or type of agent.

FIG. 1 shows a flow chart of an example method, which may be a computer implemented method and may be a method of determining a halftone screen encoding a signature. This may for example provide a means to validate a source of a printed output which is printed using print instructions generated using a particular halftone screen (i.e. a halftone screen encoding a particular signature arrangement of halftone screen tiles).

The method comprises, in block 102, by at least one processor, obtaining a first halftone screen tile having a first halftone pattern. A halftone screen tile may be a portion of a halftone screen, which when arranged with other halftone screen tiles forms a complete halftone screen. For example, the halftone screen tile may be a square portion of a halftone screen and may be arranged in a grid with other square halftone screen tiles to form a screen. However, in other examples, the halftone screen tile(s) may be any suitable shape for example any shape which tessellates, for example a hexagon or a triangle, or may tesselate with a complementary tile shape.

Obtaining a halftone tile may comprise generating a pattern on a deterministic basis. For example, the pattern may be a geometric pattern. In other examples, obtaining the halftone tile may comprise retrieving the halftone tile from a memory, or over a network or the like.

In some examples herein, the halftone screen tile may represent an amplitude modulation (AM) halftone scheme, and the pattern may comprise a specification of a location of the center for a dot or spot of applied print material, wherein the size of a dot/spot may change depending on the image data to which the screen is applied. The pattern may comprise, in some examples, a line angle of the halftone screen tile, i.e. a dimension along which dots tend to grow in an elliptical AM halftone scheme (in which the dots have a generally elliptical shape).

Block 104 comprises obtaining a second halftone screen tile having a second halftone pattern. The second halftone pattern may be obtained in a similar manner to that of the first halftone screen tile, however it may be visually distinct from the first halftone pattern, such that when a first image portion is printed using the first halftone pattern and a second image portion is printed using the second halftone pattern, the different halftone screen tiles are discernible therein. In some examples, the first and second halftone patterns may be visually similar so that if a first portion of an image is printed using the first halftone pattern and a second portion of the same image is printed using the second halftone pattern, these may together form a coherent (or in some cases, continuous) pattern in which the tiles are visually complimentary. However, the first and second halftone patterns may be sufficiently different so that they are identifiable, for example on closer examination by a person or by a computer processing a captured image of the printed image. In some examples the pattern may be discernible to the human eye, however in some examples an apparatus may be used to assist in discerning the halftone pattern (e.g. a magnifying glass or partially transparent overlay).

In some examples, the first and second halftone patterns may be related to one another, for example one being a transformation of the other. Thus, the second halftone tile may be obtained by transforming the first halftone tile (or vice versa). Some such examples are discussed in greater detail below.

Block 106 comprises determining a halftone screen having a predetermined spatial arrangement of the first and second halftone screen tiles, wherein the relative placement of the first and second halftone screen tiles in the predetermined arrangement provides a signature for the halftone screen which when applied to image data provides a printed output in which the signature is discernible.

The first and second tiles in the halftone screen are arranged, derived or configured such that, when the halftone screen is used to process image data to provide print instructions for generating a printed output, the arrangement is discernible in the printed output to provide the signature for the printed output. This may in practice be achieved by distributing threshold values of the screen according to the signature (spatial) arrangement of tiles.

In general, in halftoning, print agent is deposited when a pixel value in image data exceeds a threshold value of a corresponding pixel in the halftone screen (or in some examples, print agent may be deposited when the pixel value is lower than the threshold value). For example, the halftone screen may comprise areas which have relatively high threshold values and are therefore more likely to result in voids in the printed output, and other areas with relatively low threshold values which are more likely to be printed upon.

For example, using such a halftone screen, a discernible pattern may be embedded with the signature arrangement of first and second tiles via the halftone screen. The signature arrangement may be discernible therein, for example by visual inspection (which may in some examples be a naked eye visual inspection or a magnified visual inspection). In some examples, the inspection may be carried out in light which renders the pattern visible (for example, UV light or IR light which causes a print agent to fluoresce or the like). In other examples, the inspections may be carried out using optical sensing apparatus, for example magnifying apparatus and/or a partially transparent overlay comprising a corresponding signature arrangement, and/or may comprise an inspection outside the observable frequency range of human vision, which may for example be able to detect patterns which are not discernible to the human eye.

In summary, the halftone screen may be encoded with a signature formed by a particular arrangement of halftone screen tiles.

In some examples, the determined halftone screen comprises a signature spatial arrangement of tiles which is unique (or substantially unique) to that halftone screen. As noted above, this means that the signature may be used to validate, at least in part, a source of a printed output (or to increase a confidence that the printed output originated from the source). For example, the printed output may be inspected to determine if it includes a signature corresponding to a particular halftone screen. In such an example, there may be a high degree of confidence that the printed output originates from an entity which had access to the halftone screen associated with that signature. The same halftone screen may be used to provide a signature to any number of printed outputs, which may be different from one another (for example, showing different images), but can have the same signature.

Therefore, the signature arrangement may provide a security feature which is embedded in a printed output. In some examples, the signature arrangement may be associated with a particular entity and/or print apparatus which generated or received the halftone screen.

In some examples, the method may comprise preventing the same signature from being encoded in more than one halftone screen. For example, determining the halftone screen may comprise selecting a predetermined halftone screen from a plurality of predetermined halftone screens, or selecting a predetermined signature arrangement from a plurality of predetermined signature arrangements. In such an example, the method may further comprise preventing, using at least one processor, the selection of a previously selected halftone screen/signature in response to a subsequent request for a halftone screen. For example, the halftone screen/signature may be deleted from a list, or the index thereof may be changed to render it unselectable once it has been selected once.

In other examples, there may be a large number of possible signatures/screens such that selection of the same screen is sufficiently rare to avoid a security concern associated with re-selection of the same screen.

In some examples, the halftone screens/signatures may be stored and/or determined in a secure manner, or a tamper evident manner. In some examples, a determined halftone screen may be transmitted to some other entity (for example, a database or remote server) securely, for example having been encrypted.

In some examples, halftone screens may be generated in advance of a print job, and provided to a printer as a 'ready to use' halftone screen. As such screens are used by printers in converting image data into a print-ready format, this does not result in a change to the workflow of the printer.

FIG. 2A is an example illustrating a pattern of a first halftone screen tile 202 and FIG. 2B is an example illustrating a pattern of a second halftone screen tile 204. In this example, each of the first and second halftone screen tiles 202, 204 comprise an amplitude modulated (AM) line screen halftone pattern, which tends to result in the printing of elliptical, or elongated, dots or spots of print agent, however in other examples they may comprise other types of halftone patterns (e.g. frequency modulated (FM) halftone patterns or hybrid FM-AM halftone patterns). An AM halftone screen for providing a tile may comprise an array or matrix of halftone threshold values providing a plurality of dot centers with locations indicated by the black marks in FIGS. 2A and 2B (although in practice these may be point locations). When applied to an image to be printed, relatively small dots are printed at the dot centers in lighter areas of the image whereas in darker areas of the image relatively large dots are printed at each dot center. As the dots grow in size from lighter to darker regions of the image, the dots become connected to form continuous regions on which ink is deposited. As noted above, in some examples, the dots are not circular, for example the dots may have an elliptical shape. A line screen comprises such elliptical dots, and as they grow in size they become connected to form parallel lines.

Thus, when printing a relatively light image, the printed output may have a pattern imposed thereon similar to that shown in FIGS. 2A and 2B. However, when printing a darker image, the pattern may appear more like that shown in FIG. 2C and FIG. 2D which correspond to the first halftone screen tile 202 and the second halftone screen tile 204 respectively. In such relatively darker portions of the image, the dots become enlarged such that they join together to form continuous lines.

In a halftone line screen, the angle of the axis of the elliptical dots is arranged so that the elliptical dots can form parallel lines with a particular orientation. The line screen may be characterised by a screen resolution which defines the spacing between adjacent lines, which may be measured in lines per inch (LPI), and an angle measured between the line orientation and a reference direction.

The first halftone screen tile 202 comprises a line screen characterized by a first line orientation and the second halftone screen tile 204 comprises a line screen characterized by a second, different, line orientation. In this example the screen resolution of the first halftone screen tile 202 is the same as the screen resolution of the second halftone screen tile 204, however in some examples different halftone screen tiles may comprise different screen resolutions. In addition, in these examples, the dot centers are arranged in lines oriented along the screen line orientation. In this example, the spacing between the lines of the dots is at least slightly greater than the spacing between the dots in the line, which further enhances the formation of distinct lines in a printed output. Each halftone screen tile may be embodied as an array or matrix of halftone threshold values.

In other examples, therefore, lines could be produced using circular dots which are arranged in lines, wherein the spacing between the dots in the line is less than the spacing between the lines. Other arrangements and dot shapes are possible, but the use of elliptical dots is well suited to forming lines.

To form a halftone screen from the first and second halftone tiles 202, 204, they may be arranged so that they form a larger 'super-tile' 210 as illustrated in in FIG. 2E. In this example, copies of the first and second halftone tiles are arranged in a grid of 8 by 8 tiles to form the super-tile 210, illustrated printed at the same grey level as used in FIGS. 2C and 2D. The positions of the first and second halftone tiles within the super-tile 210 defines the signature. For example, the tile in the second row of the leftmost column is a first halftone tile and the tile in the fourth row of the leftmost column is a second halftone tile. Each of the other tiles in the super-tile 210 is either a first halftone tile 202, 206 or a second halftone tile 204, 208.

FIG. 2F shows a portion of the signature arrangement of tiles within a portion 212 of the super-tile 210. The positions of the first halftone tile 202, 206 illustrated by FIGS. 2A and 2C are labelled 'A' and the positions of the second halftone tile 204 illustrated by FIGS. 2B and 2D are labelled 'B'. In this example, the super-tile may be considered to be made up of rows and columns having characteristic arrangements. Thus, the signature of the super-tile includes having four first tiles in four adjacent columns of a first and second row, an 'ABAA' pattern in the same columns of a next row and a 'BABA' pattern in the same columns of a next row after that. The signature may be obtained by categorising the tiles.

In some examples, a portion of the halftone screen, or a portion of the super-tile 210, may comprise a characteristic to register the pattern for matching. For example, a 4×4 block of 16 tiles of the same type may indicate a designated position within the halftone screen. In some examples, the characteristic of the registration portion may be unique in that it does not appear in other portions of the halftone pattern, to allow identification of the registration portion.

The super-tile 210 may be smaller than the image to be printed, so in order to determine a halftone pattern for the image, the super-tile may be repeatedly tiled to form a larger halftone pattern. This also provides redundancy so that the signature may be read from multiple parts of the image. Furthermore, some tiles may not be readily discernible in some super-tiles 210 if they are in particularly light or dark regions of the image. Repetition of a super-tile 210 may therefore increase the likelihood that a signature may be identified within a printed image.

Figure 3C:
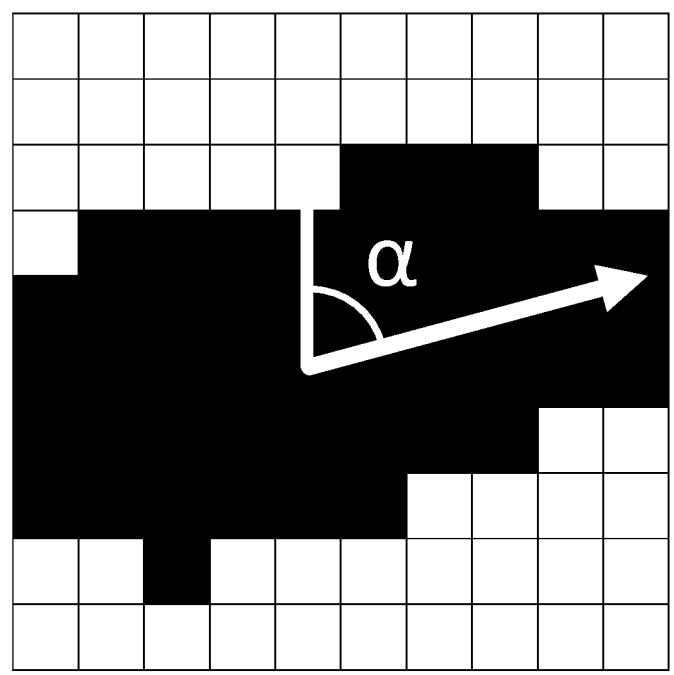

FIGS. 3A to 3C depict a portion of an example matrix of threshold values (or halftone pixel values) of a (portion of a) halftone tile. The matrix is centered around a dot center (indicated in FIG. 3A by with a bold outline) of the tile and this example depicts a single dot center of the halftone pattern. However, in practice a halftone tile may comprise more than one dot center, as shown in FIGS. 2A and 2B, and these may be associated with the same or different distributions of values. The number of dots may be a function of resolution and screen LPI, for example for a printing resolution of 1200 dpi, and a screen resolution of 180 LPI, there may be around 180 dot centers per inch. FIG. 3A depicts a matrix of values ranging from 0 to 1. The lowest values are towards the dot center of the matrix and highest values are near the edge of the matrix. Each value in the matrix corresponds to a pixel of the image to be printed, and each pixel of the image to be printed corresponds to a grey level value ranging from 0 to 1, wherein 0 is white and 1 is black. The grey level values of the image to be printed are compared with the threshold values in the matrix and if the grey level value is greater than the corresponding threshold value then a drop of ink is deposited in that position, and if the grey level value of the image is less than or equal to the threshold value no ink is deposited.

FIG. 3B is an example of the dot which is printed using this matrix of threshold values which is applied to an image portion having a grey level value of 0.55. Each position in the matrix which has a threshold value of less than 0.55 is colored black to indicate that ink will be deposited in these positions and the other positions remain blank. It can also be seen in this figure that the distribution of values within the matrix is not symmetrical and so it produces an elliptical dot.

FIG. 3C is a further example of the dot produced by this matrix at a grey level of 0.55. In this example a vertical line indicates a reference direction, and the axis of the ellipse is at an angle of $\alpha$ to the reference direction. A halftone tile may comprise several of these matrices arranged such that when applied to an image the halftone pattern forms as a series of parallel lines at the angle $\alpha$ to the reference direction. The first and second halftone tiles described in relation to FIGS. 2A and 2B may be formed in this way to create an AM line screen.

In some examples, each halftone pattern comprises a predetermined arrangement of dot centers, and each halftone screen tile comprises a matrix of halftone threshold values, each value being determined based on its distance from a dot center such that, when the halftone screen is applied to image data, higher grey level values in an image portion result in print instruction to print larger continuous dots of print agents.

In some examples, each matrix comprises lower halftone threshold values near the dot center, for example as depicted in FIGS. 3A to 3C.

Figure 4A:
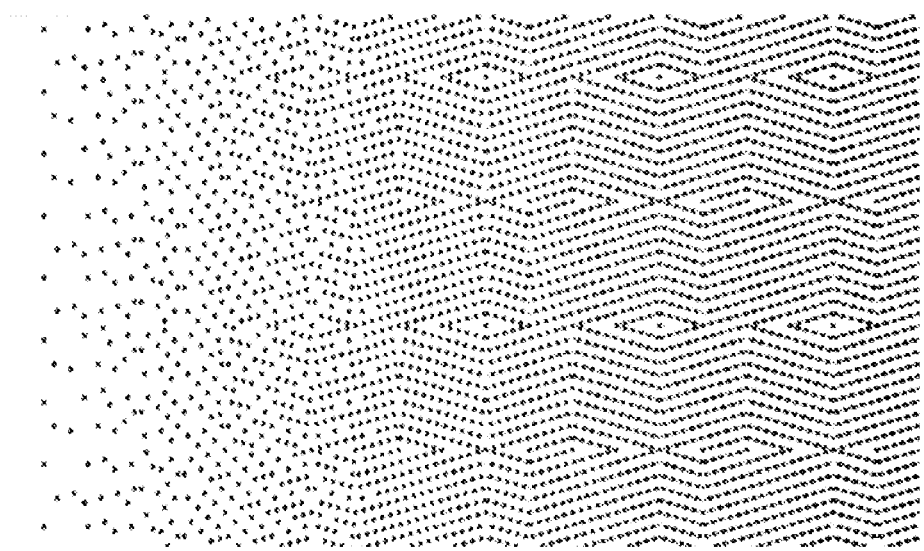
FIGS. 4A to 4E are examples of printed gradient images using a determined halftone screen.
Figure 4B:
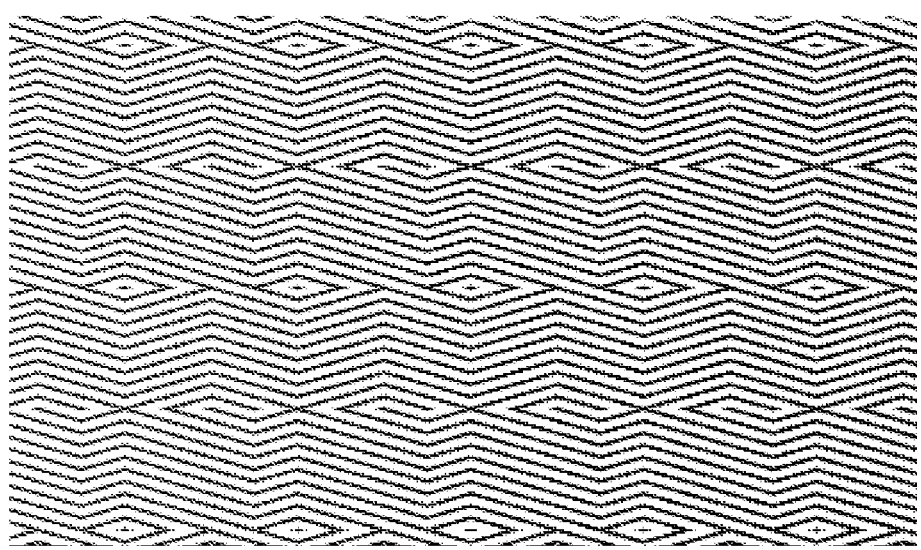
Figure 4C:
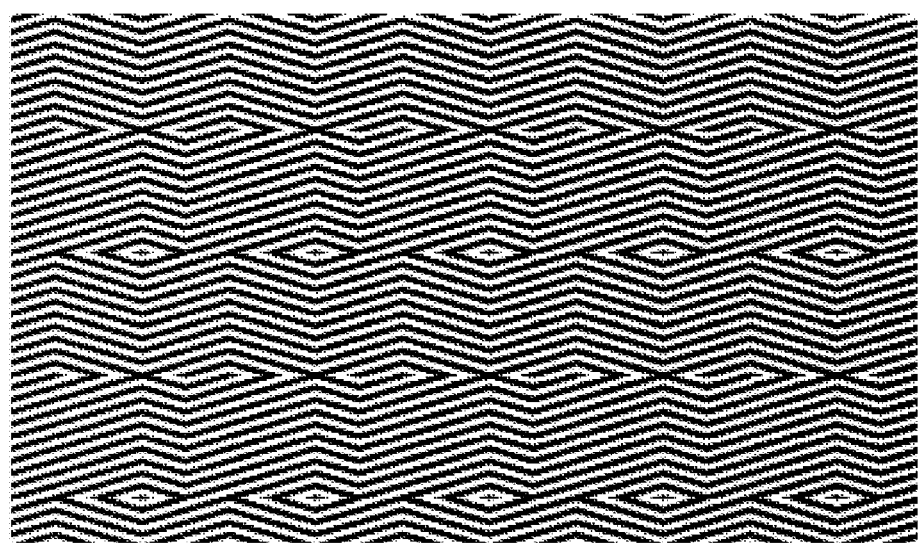
Figure 4D:
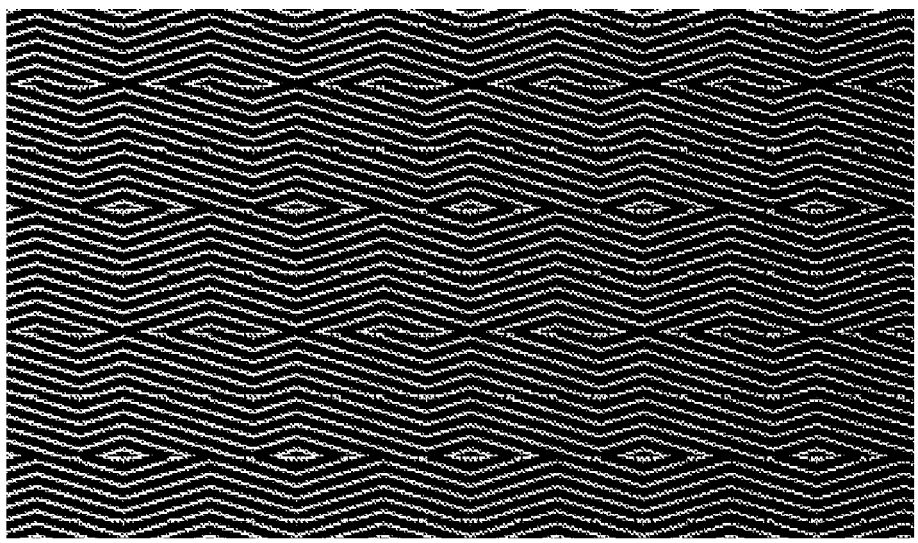
Figure 4E:
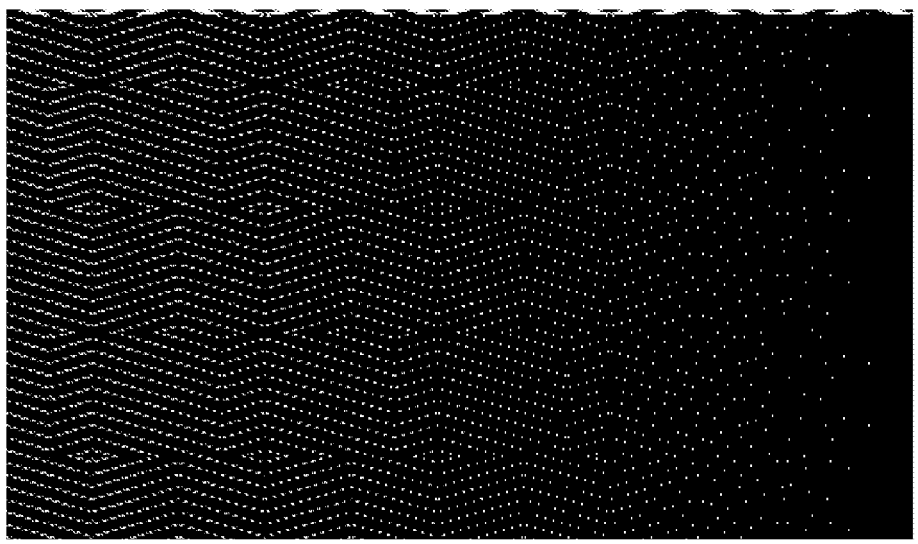

FIGS. 4A to 4E illustrate how a range of grey levels may be rendered using a halftone pattern of tiles as described herein. In each of these figures, the grey level of image data to which a halftone screen made up of super-tiles is applied is between 0 (white, or no colorant to be deposited) and 1 (black, or maximum amount of colorant to be deposited) and increases from left to right in each Figure. In other words, the density of ink increases from left to right so that the right side of each figure appears darker than the left side. FIG. 4A shows grey levels ranging from 0 (i.e. white) to about 0.10, from left to right, illustrating how, as the dots increase in size with increasing grey level, they may begin to visually form lines. The dots on the left of FIG. 4A may be somewhat exaggerated in size for the sake of reproducibility of the Figure. FIG. 4B shows grey levels ranging from around 0.25 to 0.35, from left to right. FIG. 4C shows grey levels ranging from about 0.50 to 0.60, from left to right. FIG. 4D shows grey levels ranging from around 0.75 to 0.85, from left to right. FIG. 4E shows grey levels ranging from around 0.90 to 1 (i.e. black), from left to right. As can be seen in these figures, the halftone tiles in the halftone pattern are visually discernible in the printed image at all but the extremes of the grey level values (i.e. values at or close to 0 and 1) and therefore a signature is encoded in the arrangement of the halftone tiles and may generally be decoded from a printed image having a variety of grey levels.

Figure 5:
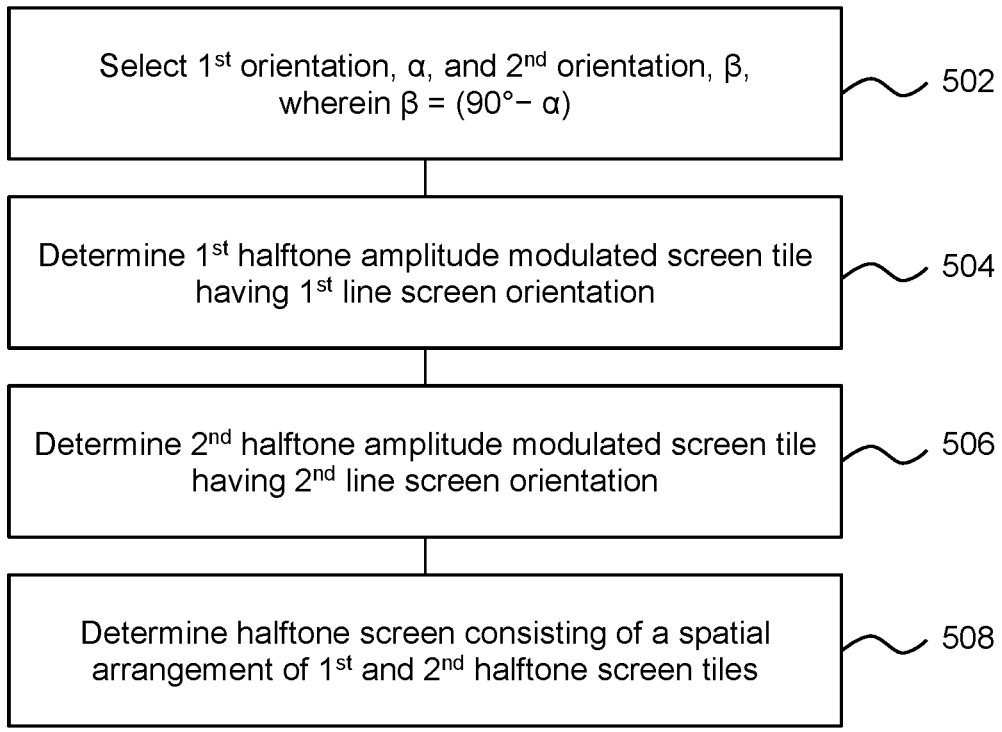
FIG. 5 is an example of a method of determining a halftone screen encoding a signature arrangement of halftone screen tiles.

FIG. 5 is an example of a method of determining a halftone screen which may be implemented, at least in part, by at least one processor.

In this example, the first and second halftone patterns are amplitude modulated line screens. For example, the first and second halftone screen tiles may be similar to the tiles illustrated by FIGS. 2A to 2D.

In this example, the second halftone pattern is a geometrical transformation of the first halftone pattern, in particular the first halftone pattern has a first line screen orientation, and the second halftone pattern has a second line screen orientation. This transformation may comprise, in effect, rotating the elliptical dots of the halftone pattern. In other words, the axis of each dot may be rotated about its dot center when converting between a first and second tile pattern. Moreover, the location of the dot centers may be modified. In some examples, the transformation may comprise rotating the lines of the line screen, modifying the position of the dot centers within each tile. However, in other examples the second halftone pattern may be another type of geometrical transformation of the first halftone pattern, for example it may be a rotation, a mirroring, scaling, or any other geometrical modification. In this example the halftone patterns are line screens comprising a plurality dot centers, around which elliptical dots are formed. The angle of the axis of the ellipses determines the angle of the lines in the line screen. Therefore, in some examples, the geometrical transformation may be a rotation of these ellipses to create the appearance of lines at different angles. For example, the first halftone pattern may comprise ellipses orientated at an angle $\alpha$ to a reference direction, as described in FIG. 3C. The second halftone pattern may comprise ellipses oriented at a second, different angle $\beta$. In this way two halftone screen tiles are formed with lines at different orientations. While in some examples, the location of the dot centers may be the same in both patterns, in other examples the location of the dot centers may be modified. For example, the dot centers may be arranged in lines having at least substantially the same orientation angle as the ellipses, wherein, in some examples, the spacing between the lines may be greater than the spacing of dot centers within the lines.

In this example, block 502 comprises selecting the first line screen orientation and the second line screen orientation such that when a first halftone screen tile is arranged adjacent to a second halftone screen tile, lines of the first halftone pattern and second halftone pattern align to form a continuous pattern. In this example the first orientation is at an angle of $\alpha$ relative to a reference direction and the second orientation is at an angle of $\beta$ relative to the reference direction, wherein $\beta=(90°-\alpha)$, although this need not be the case in all examples.

In some examples, the angles $\alpha$ and $\beta$ may be selected to provide a particular appearance. For example, the angles may be selected to reduce the visual distortions, or a negative visual impact, created by embedding the signature in the image. For example, the angles may be selected such that the lines of first and second halftone screen tiles form a continuous pattern when a first halftone screen tile is arranged next to a second halftone screen tile. This may be achieved by selecting the angles $\alpha$ and $\beta$ such that $\beta=(90°-\alpha)$. For example, the first orientation, $\alpha$, may be 37° and the second orientation, $\beta$, may be 53°. The first and second halftone tiles 202, 204, 206, 208 depicted in FIGS. 2A to 2D are designed according to this equation, and therefore when arranged in the super-tile 210 depicted in FIG. 2E, the lines of the halftone screens tend to form continuous lines (however tiled) and therefore reduce the visibility of the signature within the halftone screen, and/or provide a visually attractive pattern. Similarly, the halftone screen tiles used in creating the halftone pattern shown in FIGS. 4A to 4E have been determined according to this equation providing continuous lines across adjacent halftone screen tiles.

The equation $\beta=(90°-\alpha)$ may provide a halftone pattern which reduces visibility (or a negative visual impact) of the encoded signature, however, when a different type of halftone pattern is used, a different transformation may be used to reduce visibility/visual impact of the encoded signature.

In some examples, there may be no particular relationship between the tiles, and/or no attempt to create a visually pleasing effect to the tiling.

Block 504 comprises determining a first halftone screen tile having a first halftone pattern, wherein the first halftone pattern is an amplitude modulated line screen. An amplitude modulated line screen may be determined as described above. The first halftone pattern may be characterised by the angle of the line screen. In this example the line screen orientation is the first line screen orientation $\alpha$.

Block 506 comprises determining a second halftone screen tile having a second halftone pattern, wherein the second halftone pattern is an amplitude modulated line screen. The second halftone pattern may be determined in a similar manner to the first halftone screen pattern, however, in this example the second halftone screen pattern has a second line screen orientation $\beta$.

Block 508 comprises determining a halftone screen having a predetermined spatial arrangement of the first and second halftone screen tiles, wherein the relative placement of the first and second halftone screen tiles in the predetermined arrangement provides a signature for the halftone screen which when applied to image data provides a printed output in which the signature is discernible. The signature may be encoded by the locations of halftone screen tiles within a super-tile, for example as described in relation to FIGS. 2E and 2F. For example, instances of each of the different halftone screen tiles may be arranged in a grid, and the information encoded in the locations of the different halftone screen tiles within the grid. For example, a first position in a grid (e.g. leftmost column and top row) may correspond to a first tile, and so on.

In this example, the halftone screen consists of first halftone screen tiles and second halftone screen tiles, that is the super-tile may comprise exactly two different types of halftone tile. This is a simple way of encoding signatures into an image and a large signature space could be provided (i.e., there may be a large number of different signatures formed using different arrangements of just two tiles). However, in principle, a larger number of halftone tiles may be used.

A printer operator may apply the halftone screen to image data to determine print instructions, and print an image based thereon. Applying the halftone screen to image data may comprise associating at least one pixel of the screen (wherein each pixel of the screen is associated with a halftone threshold value) with a pixel of the image data, comparing an image pixel value with the threshold value of the or each halftone screen pixel, and determining print instructions (which may for example be binary and/or include a number or size of print agent dots) for each image pixel accordingly. The printed image may therefore have the signature embedded therein. In some examples, the halftone screen comprises a plurality of duplicated 'super-tiles' each comprising the same arrangement of first and second halftone tiles.

In some examples, halftone screens may be applied in a plurality of color planes (e.g. CMYK color planes). However, the signature may not be present in all color planes and may nevertheless be detectable in some instances. It may be noted that, in some examples, a relative rotation may be applied to a particular halftone screen when using the halftone screen for multiple color planes to avoid moiré effects. In such cases, if the pattern is such that a relative rotation would mean the pattern is offset in the different color plane (and it is intended that the pattern should be aligned in all planes), then in some examples, the digital image planes may be rotated prior to halftoning, then rotated back prior to printing.

A print apparatus may for example comprise print apparatus components such as printhead(s), at least one print agent supply, and the like. Where the print apparatus is a 'two dimensional' printer, it may for example comprise a laser printer or an inkjet printer or the like, and may comprise a print head, substrate handling system, sources of inks or toner, and the like. Where the printer is a 'three dimensional' printer, it may comprise, or be associated with, a print bed, a fabrication chamber, a print head, at least one energy source, a source of build material, or the like.

Figure 6:
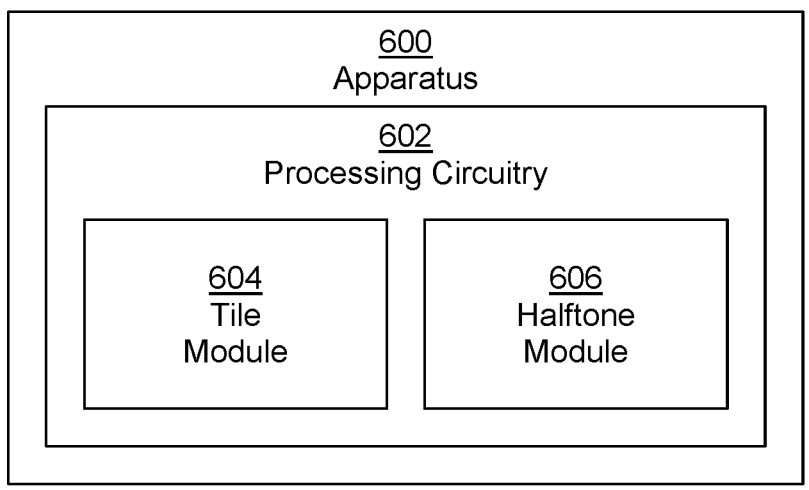
FIGS. 6 and 7 are simplified schematic drawings of example apparatus comprising processing circuitry for determining halftone screens.

FIG. 6 shows an example of apparatus 600 comprising processing circuitry 602. The processing circuitry 602 comprises a tile module 604 and a halftone module 606.

In use of the apparatus 600, the tile module 604 is to obtain a first and a second halftone tile, wherein the first halftone tile comprises an elliptical dot halftone pattern comprising a plurality of dot centers and having a first orientation and the second halftone tile comprises an elliptical dot halftone pattern comprising a plurality of dot centers and having a second orientation which is different to the first orientation. In some such examples, the location of the dot centers may be the same in the first and second halftone tiles, while in other examples the location of the dot centers may be modified between the two types of tiles. The tile module 604 may obtain the first and second halftone tiles as described above, for example in blocks 102 and 104 of FIG. 1 or blocks 504 and 506 of FIG. 5.

In use of the apparatus 600, the halftone module 606 is to determine a halftone screen comprising a tiling of the first and second tiles in which a signature is encoded by the relative placement of the first and second halftone tiles within the halftone screen. The halftone module 606 may determine the halftone screen as described above, for example in block 106 of FIG. 1 or block 508 of FIG. 5.

In some examples, the first orientation and second orientation are determined such that adjacent first and second halftone tiles provide a continuous line pattern. For example, the first orientation $\alpha$ and the second orientation $\beta$ may be related by the equation $\beta=(90°-\alpha)$, as described in relation to FIG. 5.

Figure 7:
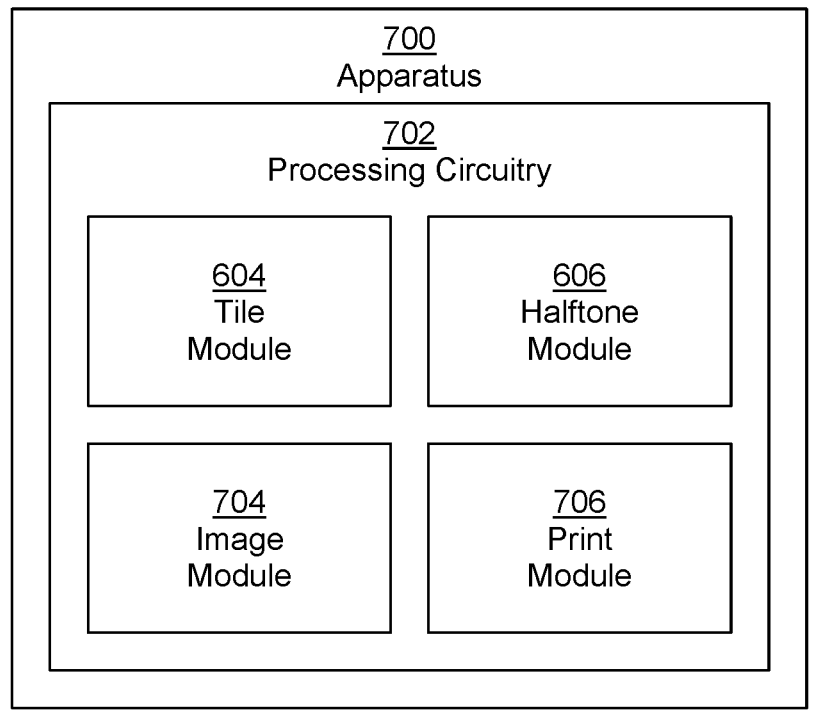

FIG. 7 shows an example of an apparatus 700, which comprises processing circuitry 702. The processing circuitry 702 comprises the modules of the processing circuitry 602 of FIG. 6. The processing circuitry 702 further comprises an image module 704 and a print module 706.

In use of the apparatus 700, the image module 704 is to apply the halftone screen to an image to be printed to generate print instructions such that the elliptical dot halftone patterns are discernible in the image to provide a signature for the image when printed. Applying the halftone screen may comprise applying a halftone screen such as that described in FIGS. 3A to 3C. This may for example comprise specifying area coverage(s) for some print agents such as ink, toner, colorants and the like. In some examples, the print instructions comprise a print agent amount associated with pixels. For example, the image may be represented as a grid of pixels having associated pixel values (in some examples, for each of a plurality of different color separations), and each pixel value may be compared to a corresponding pixel in the halftone screen to determine if a given print agent is to be applied in a corresponding location when printing.

In use of the apparatus 700, the print module 706 is to execute the print instructions to print the image after the halftone screen is applied thereto. The print instructions may, in use thereof, control a print module 706 comprising a print apparatus to print the image using the halftone screen determined by the halftone module 606.

The print apparatus may, in use thereof, print the image according to the print instructions. For example, this may comprise selectively applying print agents, for example through use of 'inkjet' liquid distribution technologies. The print apparatus may comprise additional components not described herein, for example any or any combination of printhead(s) for distributing print agents, energy sources such as heat lamps and the like.

The processing circuitry 602, 702 may in some examples carry out any or any combination of the blocks of FIG. 1 or 5.

Figure 8:
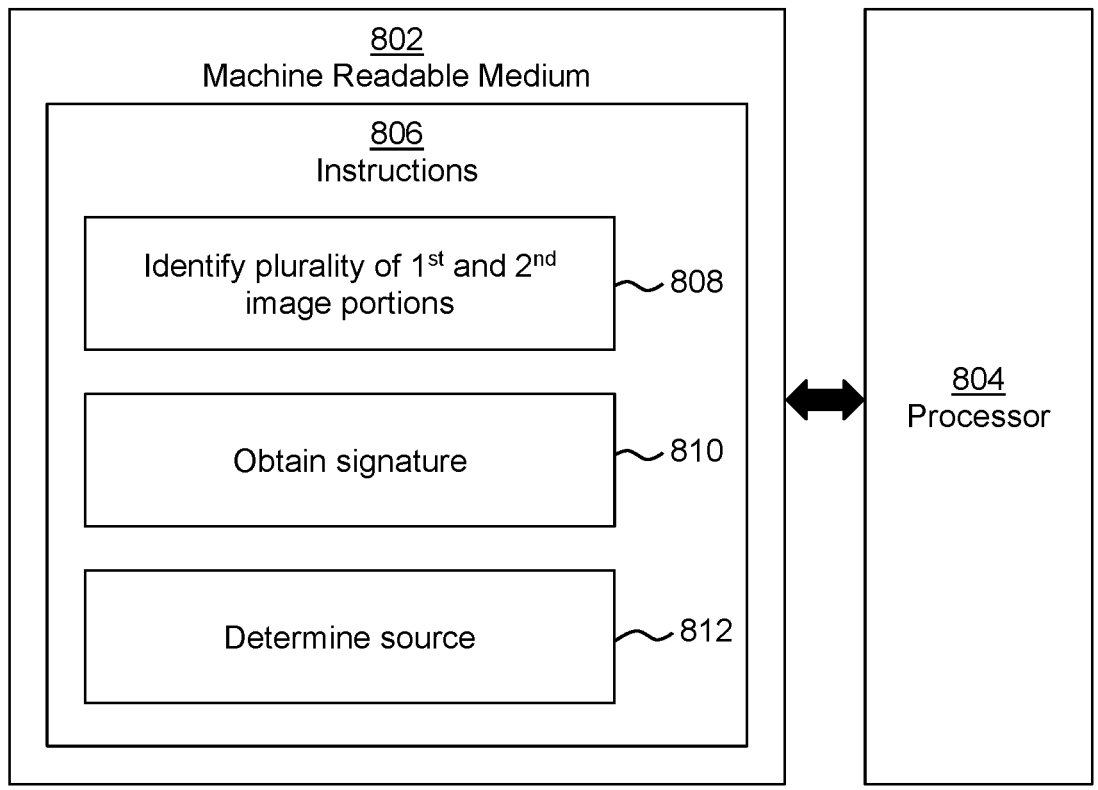
FIGS. 8 and 9 are simplified schematic drawings of examples of a machine readable medium associated with a processor.

FIG. 8 shows a machine readable medium 802 associated with a processor 804. The machine readable medium 802 comprises instructions 806 which, when executed by the processor 804, cause the processor 804 to carry out tasks.

The machine readable medium 802 may include instructions which, when executed by the processor 804, cause the processor 804 to carry out any or any combination of the blocks of FIG. 1 or FIG. 5. In some examples, the instructions may cause the processor to act as any part of the processing circuitry 602, 702 of FIG. 6 or FIG. 7.

In this example, the instructions 806 comprise instructions 808 to cause the processor 804 to identify, in a digital representation of a printed image, a plurality of first image portions printed using a first halftone tile and a plurality of second image portions printed using a second halftone tile, wherein each tile comprises a different halftone pattern. In the example described in FIGS. 2A to 2C, identifying the first and second image portions may comprise identifying portions of the image with lines of the halftone screen at a first and second orientation respectively.

In this example, the instructions 806 comprise instructions 810 to cause the processor 804 to obtain a signature for the printed image based on the relative spatial positions of the first and second image portions in the printed image. In some examples, a super-tile comprising an arrangement of halftone screen tiles may be identified, and the signature obtained from the arrangement of first and second halftone screen tiles within the super-tile. This may comprise identifying a plurality of tiles, and determining for each tile whether it is a first halftone screen tile or a second halftone screen tile, based on a characteristic of the tile. The characteristic may be an orientation of a line screen in the halftone pattern, as described in relation to FIGS. 2A to 2F, or may be some other discernible characteristic of the halftone patterns of the first and second halftone screen tiles.

One particular example of signature extraction is described in relation to FIGS. 10A to 10F below. However, in other examples, obtaining the signature may comprise comparing at least one stored signature to the image to identify a matching signature. In some examples, an indication of an expected matching signature maybe provided (e.g. a purported origin of the image). In some examples, a signature may be extracted from the digital representation. In some examples, the extraction maybe performed with input from a user.

In this example, the instructions 806 comprise instructions 812 to cause the processor 804 to determine a source of the printed image based on the signature.

In some examples, determining the source of the printed image based on the signature comprises determining if the signature is a stored signature associated with an entity. In some examples, the match may be a 'fuzzy' match, for example taking into account an element of randomization which may be introduced during the printing process. In some examples, therefore, the randomisation may be taken into account by instructions 808 and/or instructions 810. For example, an expected signature may be compared to the digital representation, and if the digital representation corresponds sufficiently closely with the expected signature, then it may be determined that the digital representation comprises the expected signature. In other examples, image processing may be used to reduce the impact of such randomisation, such as in the method described below with reference to FIGS. 10A to 10F.

This determination may in turn have different implications depending on the context. For example, in the event of a negative determination, it may indicate that the printed image is a fraudulent image, or that further validation is indicated. In some examples, if the comparison is inconclusive, a new digital representation may be requested. In the event of a match to a stored signature, this may in turn imply validation of the content of the printed page, which may for example comprise something of value (e.g. a voucher having a monetary worth, or a ticket or the like), or a technical content which may be relied upon.

The instructions 806 may be instructions to execute a computer implemented method of verifying a signature within a printed image. In some examples, the instructions 806 may be carried out by a processing apparatus having access to a stored database of halftone patterns or signatures associated with identifiers, the identifiers being associated with requesting entities. The database may be a secure database, for example having restricted access.

In addition, some examples, a purported origin of the image is also acquired by the processor 804. For example, this may comprise an entity which is purported to have printed the image (e.g. HP Indigo), and/or may comprise an indication of a specific printing apparatus. The purported origin may be used to look up an expected signature arrangement of tiles for that entity/additive manufacturing apparatus.

The method may further comprise validating a source of the image if the printed image comprises the expected signature, wherein the halftone signature may be a signature introduced using a halftone screen having a signature arrangement of tiles. In other words, an assessment may be made as to whether the arrangement matches an expected arrangement, suggesting that the purported origin is the true origin, or does not, suggesting that the purported origin is incorrect. In some examples, if a signature is not represented or identified in the printed image, then it may be determined that the patterns do not match.

While in this example the purported origin was acquired, this may not be the case in all examples. In some examples, the digital representation may be processed by image processing circuitry to determine characteristics of the arrangement of the tiles, and thereby identify a possible signature within that arrangement. This may comprise assessing a region of a digital representation corresponding to a plurality of halftone super-tiles, as, for example due to light portions or voids in the image data, each super-tile may not itself provide the full arrangement.

Figure 9:
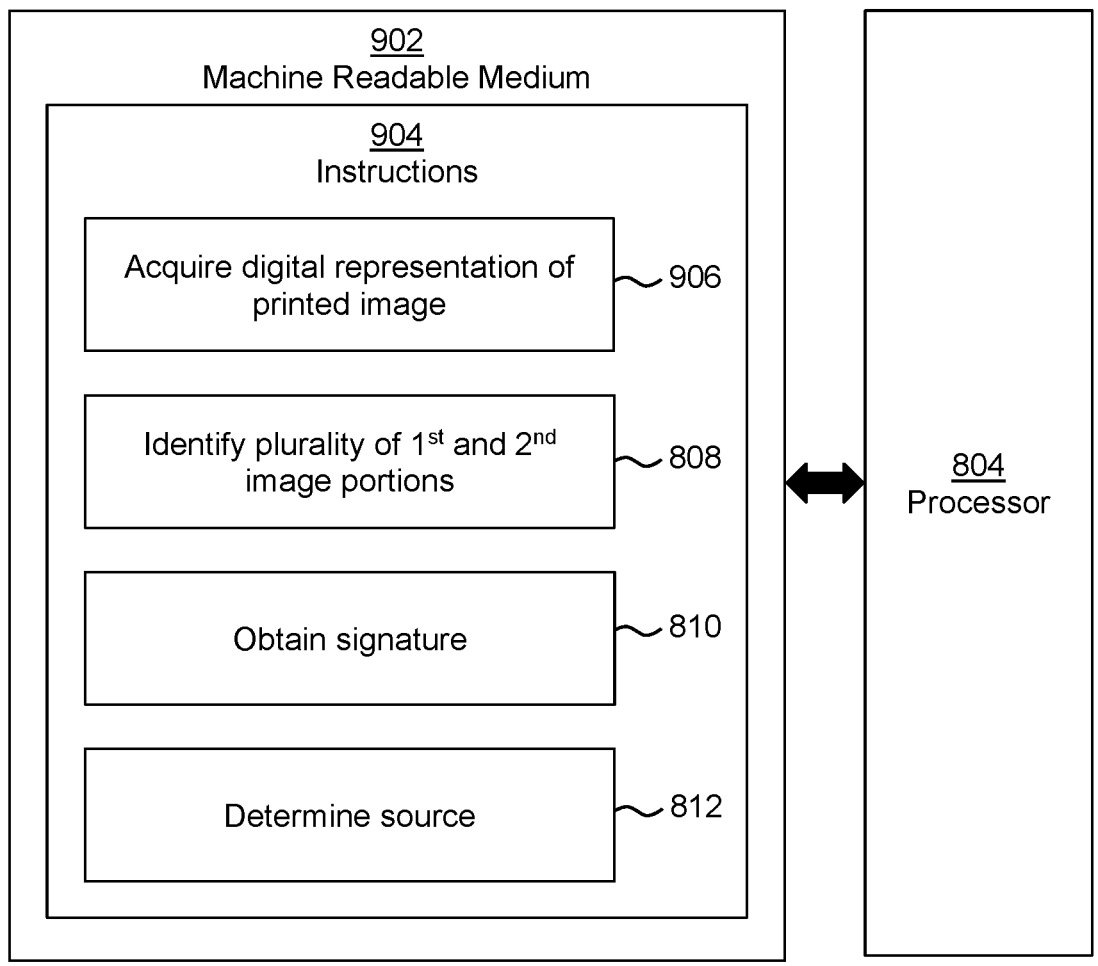

FIG. 9 shows a machine readable medium 902 associated with a processor 804. The machine readable medium 902 comprises instructions which, when executed by the processor 804, cause the processor 804 to carry out instructions 904. The instructions 904 comprise instructions 808 to instruction 812 as described in relation to FIG. 8.

The instructions 904 further comprise instructions 906 to acquire the digital representation of the printed image. In some examples, the digital representation is a digital representation of a printed output, or a portion of the printed output. For example, the printed output may be scanned or digitally photographed to provide the digital representation. In some examples, the image may be captured using a camera of a mobile telephone. This may comprise imaging a region of the image comprising at least one super-tile corresponding to a plurality of halftone tiles. In some examples, capturing the image may comprise using a camera in combination with a magnifying apparatus such as a magnifying lens or a macro lens. In some examples, capturing the image may comprise using a camera in combination with optical apparatus such as a light source to assist in capturing any pattern, for example an IR or UV light source, and/or the camera may capture images outside the human visible optical range (e.g. the camera may comprise an IR camera or the like). In some examples, the printed output may comprise a plurality of halftone super-tiles, which may provide redundancy as due to light portions or voids in the halftoned image data, each tile may not itself provide the full pattern. The number of super-tiles in a digital representation may depend on a number of factors, including the content of the printed output and convenience of capturing the number of super-tiles.

FIGS. 10A to 10E illustrate in more detail an example of acquiring a digital representation of the printed image, identifying the first and second image portions and obtaining a signature therefrom, and may be an example of the method carried out by the instructions 906, 808, 810 and/or 812.

In this example, the printed image is an RGB image (red, green, blue), and the digital representation of the printed image may be acquired and transformed from a RGB image to a greyscale image. The transformation may be achieved by summing the red (R), green (G) and blue (B) components of each pixel to provide a lightness (L) value for each pixel, for example according to the equation $L=0.29R+0.58G+0.11B$, thereby providing the greyscale image. In other examples, the physical and/or digital image may already comprise a greyscale image, and in such cases the processing described above may not be performed.

Identifying the plurality of first and second image portions may comprise applying at least one operator to the greyscale image. For example, edge detection operators may be used to enhance the pattern features within the digital image. In one example, the halftone screen tiles comprising line screens having a characteristic screen angle, such as those described in relation to FIGS. 2A to 2F, a gradient operator, such as a Sobel gradient operator, may be suitable to identify the halftone screen tiles. Other image operators, for example those which may reduce noise and/or enhance contrast in the digital image may be used in other examples.

FIG. 10A is an example of greyscale image, obtained from a printed image encoding a signature as described herein, to which a Sobel gradient operator has been applied. The image comprises relatively light and relatively dark portions which correspond to first and second halftone screen tiles. This image comprises significant noise, so identifying the plurality of first and second image portions may further comprise further processing, such as applying a filter to this image. For example, a gaussian filter may be applied. The image may then be further processed, for example by applying a threshold function, such as an Otsu threshold function, to obtain a binarized image.

FIG. 10B is an example of the image of FIG. 10A, after applying a suitable gaussian filter, such as a 11×11 gaussian filter and an Otsu filter. In this image, white and black portions are clearly visible and represent the portions of the printed image which were printed with first and second halftone screen tiles, respectively. The tiles in this image are arranged in a repeating pattern of super-tiles as described previously. In this example, the super-tiles comprise four rows and four columns of tiles, and therefore comprise 16 tiles arranged in a square grid. FIG. 10C is an enlarged image of one super-tile from the image. In this super-tile, the first row comprises three white squares then one black square, therefore the first row of the super-tile which was used to print the printed image comprised three first halftone screen tiles and one second halftone screen tile. In this way, each of the identified portions may be associated with a first or second halftone screen tile.

The signature may then be obtained from the identified plurality of first and second image portions, for example by instructions 810. FIG. 10D is an example of the signature obtained from the image of FIG. 10C. In the notation also used in FIG. 2F, the first row comprises a 'AAAB' pattern. FIG. 10D is a translation of the signature of the super-tile of FIG. 10C into this notation. Once this signature is obtained from the printed image, an identifier such as an identification number or code associated with the signature may be obtained, for example by comparing to a look up table, a database, or by some other mathematical procedure, for example by instructions 812. The signature or identifier may be presented to a user or may be saved, for example in a database. In some examples, the identifier or signature may be associated with the digital representation of the printed image, for example saved as metadata or in a database with a reference to the digital representation, for future use.

FIG. 10E is an example of the super-tile of the image, illustrated at a mid-range grey level, prior to printing. The super-tile comprises 4×4 tiles, each of which is either a first or second halftone screen tile with a first or second orientation of line screen. In this example, to illustrate the difference between the first and second halftone screen tiles, the first halftone screen tiles appear lighter than the second halftone screen tiles, however in practice their lightness may depend on their position in the image to be printed i.e. a tile in a light portion of the image will be printed with a lower density of ink than a tile in a darker portion of the image. FIG. 10F is an example of a printed and scanned image which comprises the same super-tile. In this printed image the lines of the halftone screens can be seen, with the lines of the halftone screen tiles having the same orientation as the super-tile depicted in FIG. 10E i.e. the first halftone screen tile having lines extending from top-left to bottom right and the lines of the second halftone screen tile extending from bottom-left to top-right. This example super-tile comprises 300 rows of pixels and 300 columns of pixels, however, other super-tiles may have different dimensions.

Examples in the present disclosure can be provided as methods, systems or machine readable instructions, such as any combination of software, hardware, firmware or the like. Such machine readable instructions may be included on a computer readable storage medium (including but not limited to disc storage, CD-ROM, optical storage, etc.) having computer readable program codes therein or thereon.

The present disclosure is described with reference to flow charts and/or block diagrams of the method, devices and systems according to examples of the present disclosure. Although the flow diagrams described above show a specific order of execution, the order of execution may differ from that which is depicted. Blocks described in relation to one flow chart may be combined with those of another flow chart. It shall be understood that each block in the flow charts and/or block diagrams, as well as combinations of the blocks in the flow charts and/or block diagrams can be realized by machine readable instructions.

The machine readable instructions may, for example, be executed by a general purpose computer, a special purpose computer, an embedded processor or processors of other programmable data processing devices to realize the functions described in the description and diagrams. In particular, a processor or processing apparatus may execute the machine readable instructions. Thus, functional modules of the processing circuitry 602, 702 (for example, any of the tile module 604, the halftone module 606, the image module 704 and the print module 706) and devices may be implemented by a processor executing machine readable instructions stored in a memory, or a processor operating in accordance with instructions embedded in logic circuitry. The term 'processor' is to be interpreted broadly to include a CPU, processing unit, ASIC, logic unit, or programmable gate array etc. The methods and functional modules may all be performed by a single processor or divided amongst several processors.

Such machine readable instructions may also be stored in a computer readable storage that can guide the computer or other programmable data processing devices to operate in a specific mode.

Such machine readable instructions may also be loaded onto a computer or other programmable data processing devices, so that the computer or other programmable data processing devices perform a series of operations to produce computer-implemented processing, thus the instructions executed on the computer or other programmable devices realize functions specified by block(s) in the flow charts and/or block diagrams.

Further, the teachings herein may be implemented in the form of a computer software product, the computer software product being stored in a storage medium and comprising a plurality of instructions for making a computer device implement the methods recited in the examples of the present disclosure.

While the method, apparatus and related aspects have been described with reference to certain examples, various modifications, changes, omissions, and substitutions can be made without departing from the spirit of the present disclosure. It is intended, therefore, that the method, apparatus and related aspects be limited only by the scope of the following claims and their equivalents. It should be noted that the above-mentioned examples illustrate rather than limit what is described herein, and that those skilled in the art will be able to design many alternative implementations without departing from the scope of the appended claims.

The word "comprising" does not exclude the presence of elements other than those listed in a claim, "a" or "an" does not exclude a plurality, and a single processor or other unit may fulfil the functions of several units recited in the claims.

The features of any dependent claim may be combined with the features of any of the independent claims or other dependent claims.

The invention claimed is:

1. A method comprising, by at least one processor:
obtaining a first halftone screen tile having a first halftone pattern, wherein the first halftone pattern includes amplitude modulated line screens comprising a plurality of dot centers around which elliptical dots are formed according to a matrix of threshold values, the elliptical dots having a first orientation such that an axis of the elliptical dots are at an angle of $\alpha$ relative to a reference direction;
obtaining a second halftone screen tile having a second halftone pattern, wherein the second halftone pattern includes amplitude modulated line screens comprising a plurality of dot centers around which elliptical dots are formed according to a matrix of threshold values, the elliptical dots having a second orientation such that an axis of the elliptical dots are at an angle $\beta$ relative to the reference direction, wherein $\beta=(90°-\alpha)$; and
determining a halftone screen having a predetermined spatial arrangement of the first and second halftone screen tiles, wherein the relative placement of the first and second halftone screen tiles in the predetermined spatial arrangement provides a signature for the halftone screen which when applied to image data provides a printed output in which the signature is discernible,
wherein the angle of the axis of elliptical dots determines the angle of the lines in the amplitude modulated line screen and $\alpha$ and $\beta$ have values causing the lines in the amplitude modulated line screen of the first halftone screen tile and the lines in the amplitude modulated line screen of the second halftone screen tile to form continuous lines across adjacent halftone screen tiles, and
wherein $\alpha$ is 37° and $\beta$ is 53°.

2. The method as claimed in claim 1 wherein each value of a matrix of halftone threshold values, is determined based on its distance from a dot center such that, when the halftone screen is applied to image data, higher grey level values in an image portion result in print instruction to print larger continuous dots of print agent.

3. The method as claimed in claim 2 wherein each matrix comprises lower halftone threshold values near the dot center.

4. An apparatus comprising processing circuitry, the processing circuitry configured to:
obtain a first halftone screen tile having a first halftone pattern, wherein the first halftone pattern includes amplitude modulated line screens comprising a plurality of dot centers around which elliptical dots are formed according to a matrix of threshold values, the elliptical dots having a first orientation such that an axis of the elliptical dots are at an angle of $\alpha$ relative to a reference direction;
obtain a second halftone screen tile having a second halftone pattern, wherein the second halftone pattern includes amplitude modulated line screens comprising a plurality of dot centers around which elliptical dots are formed according to a matrix of threshold values, the elliptical dots having a second orientation such that an axis of the elliptical dots are at an angle $\beta$ relative to the reference direction, wherein $\beta=(90°-\alpha)$; and
determine a halftone screen having a predetermined spatial arrangement of the first and second halftone screen tiles, wherein the relative placement of the first and second halftone screen tiles in the predetermined spatial arrangement provides a signature for the halftone screen which when applied to image data provides a printed output in which the signature is discernible,
wherein the angle of the axis of elliptical dots determines the angle of the lines in the amplitude modulated line screen and $\alpha$ and $\beta$ have values causing the lines in the amplitude modulated line screen of the first halftone screen tile and the lines in the amplitude modulated line screen of the second halftone screen tile to form continuous lines across adjacent halftone screen tiles, and wherein $\alpha$ is 37° and $\beta$ is 53°.

5. The apparatus as claimed in claim 4, wherein the processor is further configured to:
apply the halftone screen to an image to be printed to generate print instructions such that the elliptical dot halftone patterns are discernible therein to provide a signature for the image when printed.

6. The apparatus as claimed in claim 5, wherein the processor is further configured to:
execute the print instructions to print the image after the halftone screen is applied thereto.

* * * * *